(No Model.) 2 Sheets—Sheet 1.
F. JEHL.
CONTINUOUS AND ALTERNATING TRANSFORMER.
No. 379,073. Patented Mar. 6, 1888.
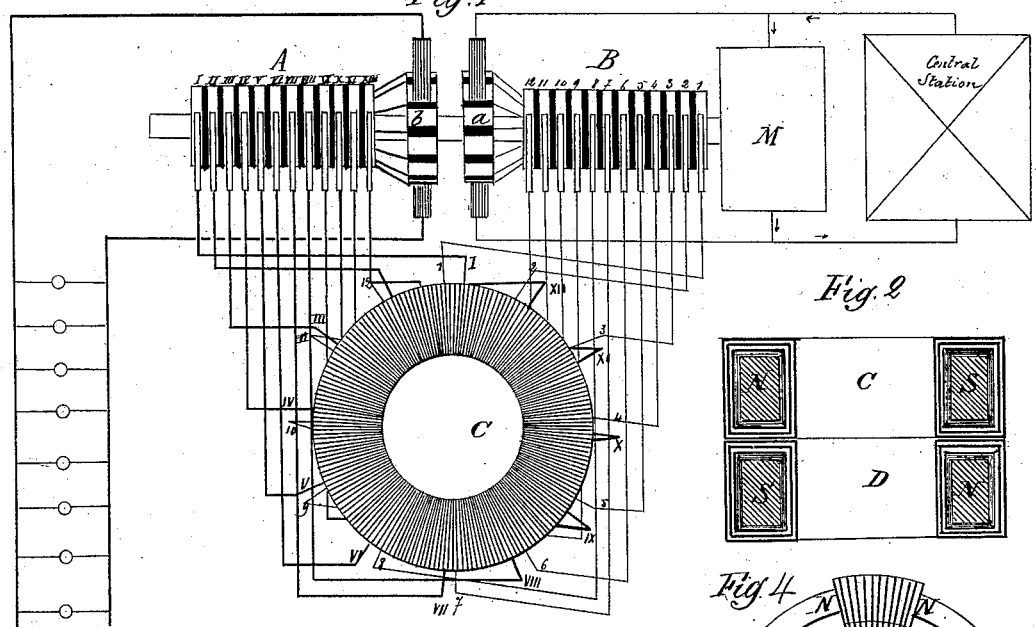
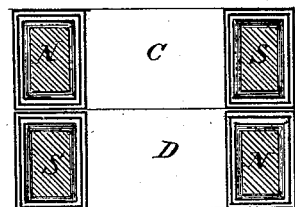
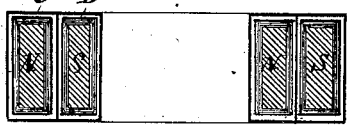
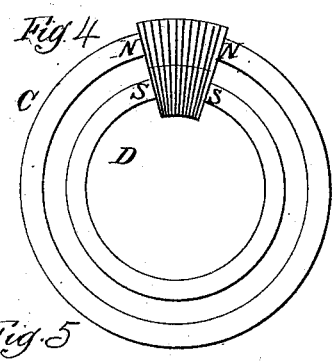
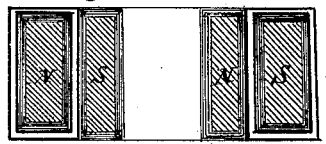
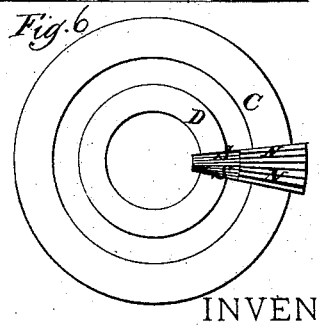
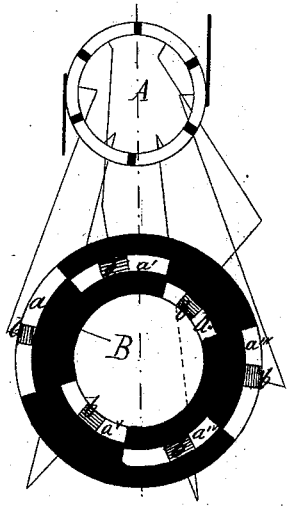
WITNESSES:
John F. Nelson
Paschal J. Ferrara
INVENTOR:
Francis Jehl
By his Attorney,
Arthur G. Fraser & Co.
N. PETERS, Photo-Lithographer, Washington, D. C.

(No Model.) 2 Sheets—Sheet 2.
F. JEHL.
CONTINUOUS AND ALTERNATING TRANSFORMER.
No. 379,073. Patented Mar. 6, 1888.
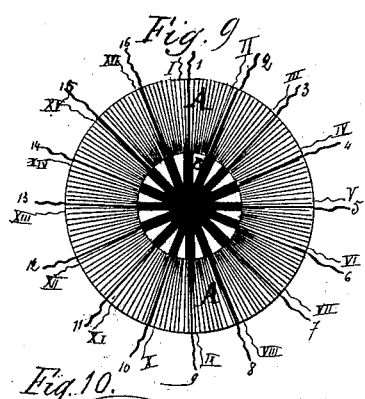
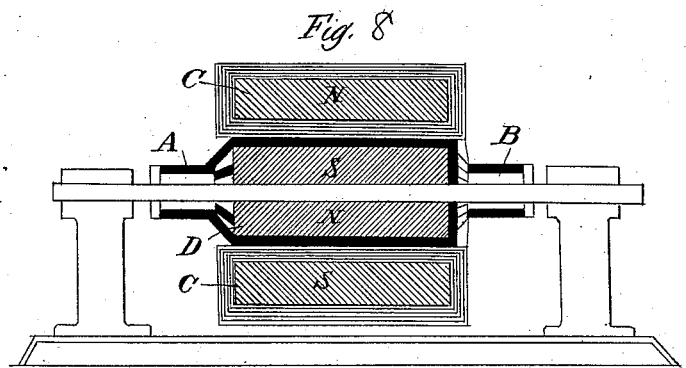
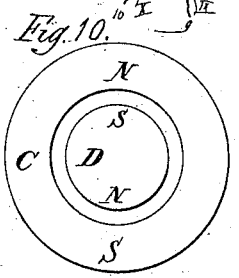
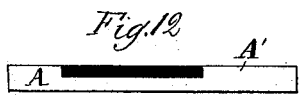
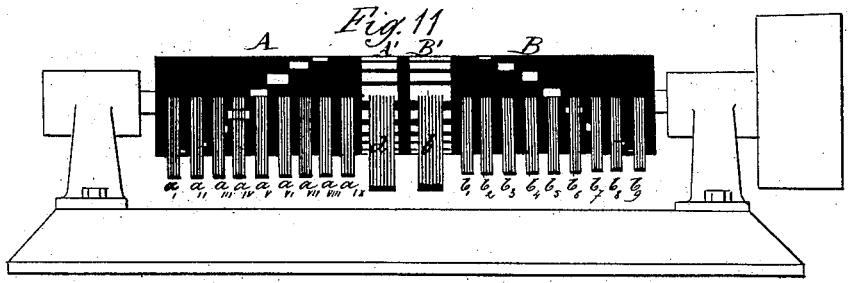
WITNESSES:
John F. Nelson.
Paschal J. Ferrard.
INVENTOR:
Francis Jehl,
By his Attorney,
Arthur G. Brown &Co.

UNITED STATES PATENT OFFICE.

FRANCIS JEHL, OF PARIS, FRANCE.

CONTINUOUS AND ALTERNATING TRANSFORMER.

SPECIFICATION forming part of Letters Patent No. 379,073, dated March 6, 1888.

Application filed February 25, 1887. Serial No. 228,800. (No model.)

*To all whom it may concern:*

Be it known that I, FRANCIS JEHL, a citizen of the United States, residing in Paris, France, have invented certain new and useful Improvements in Continuous and Alternating Transformers, of which the following is a specification.

This invention has reference to induction devices for use in the distribution of electrical energy, by means of which a current in a main or line circuit may be utilized to induce a current of the same or of a different character in a local or secondary circuit. Such devices are known as "transformers." They are essentially induction-coils, the primaries being connected to the main or line circuit and the secondaries to a local circuit. If the line carries an alternating current, this is simply passed through the primary coils, and an alternating induced current is taken off from the secondary coils and used to feed a local or consumption circuit. If the line-current is continuous, a commutator is necessary in order to alternate it in the coils. For this purpose the primary and secondary coils are each divided into sections, all of which are connected together to form one endless coil, and each of which is connected to the corresponding brush of a distribution-commutator, which directs the line-current to the respective sections successively, so that in each section it flows first in one direction and then in the other. The alternating induced currents are rectified by a commutator to render them continuous.

Figure 1 of the accompanying drawings is a diagram of the line-circuit, consumption-circuit, transformer, and commutator as arranged for continuous currents. Fig. 2 is a cross-section of the coils and their cores or iron rings. Fig. 3 is a transverse section of a modified arrangement of iron-ring cores and windings, and Fig. 4 is a plan thereof. Fig. 5 is a transverse section of a further modified arrangement of iron-ring cores and windings, and Fig. 6 is a plan thereof. Fig. 7 is a diagram showing a modified arrangement of commutator. Fig. 8 is a diametrical longitudinal section of a modified construction and arrangement of cores and coils, and Fig. 9 is an end elevation thereof. Fig. 10 is a plan showing the arrangement of the cores therein. Fig. 11 is a side elevation of a modified construction of commutator, and Fig. 12 is a detail view of one of the bars of the commutator shown in Fig. 11.

*Continuous transformers.*—In my continuous transformers I take two iron rings or hollow cylinders composed of soft-iron wires or iron. (It is well to take soft-iron wire, which is insulated so as to prevent Foucault currents.) Then around these rings I wind coils of copper wire. One system of coils acts as primary coils and the other system as secondary coils. The primary and secondary windings can be divided on both iron rings, or a primary on one and the secondary on the other. By this disposition it will be seen that each winding forms an endless piece of wire. It may be stated that both rings or cylinders are close to each other. If made flat, they are placed side by side, as shown in Fig. 2, or one may be made to fit in the inside of the other, as shown in Figs. 3 to 6. It will now be seen that if a connection is made with the primary at two points diametrically opposite each other and a current sent through, a north and south pole is created in each ring. The rings are so wound that the north pole of one faces the south pole of the other. Thus we obtain a magnetic circuit of very low magnetic resistance, and the only space between the poles is that taken up by the secondary and primary coils. Thus all the magnetic circuit is effective and productive. Now, as before stated, the primary and secondary windings are divided up into sections or coils. If each winding with its coils is connected to a commutator and the whole mounted on a shaft and made to revolve by sending a current through the primary winding, a current is also generated in the secondary winding, which can be taken off at its commutator.

I have another method by which we can work one or any number of transformers at the same time. The transformers in this case are all stationary, while the only moving part is what I call the "distribution-commutator." This works any number of transformers at a station that can be desired. With these distribution-commutators the transformers are stationary and only the distribution-commutators revolve. These commutators consist of a main commutator, the sections or bars of which are each in connection with another piece called the "supplementary" part, and which is also mounted upon the same shaft. Each bar with its supplementary piece is insulated from the others. Upon each of these supplementary pieces rests a brush, which brush is in connection with a section or coil of the winding of the transformers. It is evident that when the current enters the main commutator by means of its two brushes it passes from bar to bar, from which it passes into the supplementary pieces, one after the other, and thus produces the constant shifting of the field.

Figure 1 represents the whole arrangement. The distribution-commutator consists of two parts—A for the secondary and B for the primary set. It will be seen that, for example, in Fig. 1 the windings of the transformer C are each divided into twelve parts, and that each section of the distribution-commutator is also divided into twelve parts—viz., 1 to 12. Each one of these parts is connected to a general commutator, the twelve parts of the secondary sections going to the general commutator $b$ and the primary sections going to $a$. All the coils of the secondary winding are each connected to one of the parts of the supplementary commutator at A. The same is the case with the primary winding, which goes to B. The mode of connection can be seen from the drawings. The heavy lines represent the secondary and the light lines the primary.

It will be seen that the object accomplished is the same as if all were mounted on a shaft and made to revolve. The great advantage of this distrubution-commutator is that any number of transformers can be worked from it, the transformers being stationary while only the distribution-commutator is made to revolve; also, that the latter can go at a much higher rate of speed than so heavy a piece as the transformer is when mounted on a shaft. When the distribution-commutator is revolving and a current from the central station enters the primary, there is a constant shifting of the magnetic lines of force. This produces a current in the secondary, which is used as desired. By inspecting Fig. 1 the whole method is understood. M is the motor which turns the distribution-commutator, and receives its current direct from the central station. The transformers can be placed in parallel or in series, as desired.

It will be seen from what has been said that the great advantage of my system is that the circuit in which the magnetic lines of force run is, by means of the two iron rings, all made productive, and has very little magnetic resistance, and, as before stated, the only dead-space is that between the two iron rings, which is occupied by the wire of the primary and secondary coils, and which is very small. If only one iron ring were used, the lines of force would have to cross the air-space from one pole to another, which would weaken the field so considerably that the results given would not be sufficient for practical purposes; also, the air-space where the lines of force cross not only weakens the field, but is also dead, as there is no wire to render it productive. The same would be the case if an iron mass were inserted inside the iron ring. This would afford the lines of force a better route, making the magnetic resistance less, but leaving dead-space nevertheless, and not being productive. Thus by having two iron rings so wound that each ring generates magnetism, also by induction, the whole complete circuit of magnetic lines of force can be rendered productive. The same is the case if we take one iron ring inside of which is a drum-shaped cylinder of iron, also both ring and drum wound as already described with relation to the two iron rings. This way will also render all lines of force productive.

Fig. 3 shows the cross-section of a transformer in which one ring is inside the other, and Fig. 4 is a plan thereof wound with only a small portion of wire, so as to show clearly the magnetic poles formed in the iron rings. Fig. 5 shows the cross-section of a transformer upon which the secondary is wound on one ring, as shown by the heavy lines, while the primary is wound on both rings, as shown by the light lines. Fig. 6 is a plan of Fig. 5, but with only a small portion of the rings wound with wire. Of course it will be understood, with reference to Figs. 4 and 6, that coils (primary and secondary) are wound all around the iron rings, so that they are entirely wound with wire. The other shape of transformer, consisting of an iron ring inside of which is a drum-shaped cylinder of iron, is made as follows: I take an iron ring, Fig. 8, and wind it, for example, with the primary, while inside this iron ring I place a drum-shaped cylinder of iron and wind it with the secondary. In Fig. 8 is shown the cross-section of such a transformer. The light lines around the iron ring represent the primary and the heavy lines around the iron cylinder represent the secondary. It will be seen that the iron ring with its winding and the iron cylinder with its winding are fitted tight one in the other, and the whole mounted on a shaft. The primary is connected to a commutator on one side and the secondary to another on the other side. If, now, the whole is made to revolve and a current sent through one winding, a current can be taken off at the other. I can wind the primary on the iron cylinder and the secondary on the iron ring, or I can put a portion of each on both iron ring and iron cylinder.

Fig. 9 shows the plan of this transformer. In this case it is arranged to be used in connection with a distribution-commutator. The light lines I to XVI represent the primary, while the heavy lines 1 to 16 represent the secondary.

Fig. 10 shows the magnetic disposition of the arrangement, from which it can be seen how the poles are formed and what position they take. In fact, all that has been said about the two iron rings can be also effected by the iron ring and iron cylinder. Thus it is seen that what is essential to my invention is the winding of two endless cores with coils of wire and bringing them into such close inductive proximity that the lines of force in each core may be completed (to make a closed magnetic circuit) through the other core. If the cores are two rings, one or both of them will be essentially a hollow cylinder, although they need not be of circular shape. When one is arranged within the other, the inner one may be either hollow, as in Figs. 3 to 6, or solid, as in Figs. 8 to 10.

The windings on the two iron rings or the one ring and cylinder can be distributed in various ways—viz., one ring may be wound with the primary while the other ring or cylinder is wound with the secondary, or vice versa. Both windings may be divided in any proportion on both rings or ring and cylinder. In the last case they must be so connected that the north pole of one ring will face the south pole of the other ring or the south pole of the cylinder.

A distribution-commutator may be made as shown in Fig. 7. This consists of a main commutator, A, from which conductors lead to an insulating-plate, B. (There may be more than one plate.) Upon this plate are fastened metallic pieces $a\ a'\ a''\ a'''$, &c., which are each one in connection with one bar of the main commutator A. These metallic pieces are arranged in rows, as shown in Fig. 7. The main commutator with this plate is mounted on a shaft and made to revolve. Opposite this plate is another plate, but fixed upon which brushes are attached that make contact with the metallic pieces $a\ a'\ a''$, &c. This plate is not shown in the drawings, but the brushes are represented at $b\ b'\ b''$, &c., by shaded tints. These brushes lead to the coils of the transformer.

Fig. 11 shows another kind of distribution-commutator, of which each bar or section is longer or shorter than its neighbor. Fig. 12 shows one bar or section of this kind of distribution-commutator. A' is where the main brushes rest, while at A is the part where the brushes that lead to a part of the transformer-winding rest, and between A' and A is placed insulation, thus preventing other brushes coming in contact with it.

*Alternating transformers.*—My alternating transformers are made and shaped the same as the continuous ones, only it is not necessary to divide their windings into parts, nor to connect them to a distribution-commutator. They simply consist of two endless windings. Two points diametrically opposite each other on the primary are connected to the source of alternating current, and two points diametrically opposite each other on the secondary are connected to the line of consumption. The polarity of the magnetic system is the same as in the other transformers described above, only that it reverses according to the alternating current.

I claim as my invention—

1. A transformer consisting of two cores wound with primary and secondary coils of wire and arranged in such close inductive proximity that the lines of magnetic force in each core may be completed through the other core.

2. A transformer composed of two iron cores wound with primary and secondary coils, one of said cores being of annular form and arranged in inductive proximity to the other, whereby the lines of force in each core may be completed through the other.

3. A transformer composed of two iron rings, and primary and secondary coils wound on said rings, the said rings being arranged close together in order that each may serve for completing the lines of force generated in the other.

4. A transformer composed of a hollow iron cylinder wound with primary or secondary coils, in combination with an iron cylinder arranged therein and wound with coils, whereby the lines of force crossing through said inner cylinder react upon the coils thereon and are utilized.

5. A transformer composed of iron cores arranged in close inductive proximity, so that the lines of magnetic force in each core may be completed through the other and said cores wound with primary and secondary coils, in combination with two commutators, to one of which the primary windings are connected and to the other of which the secondary windings are connected, in such manner that when the commutators are revolved and a current is sent through the primary commutator a current may be taken off from the secondary commutator.

6. A transformer having two stationary iron cores arranged in close inductive proximity and wound with primary and secondary coils divided into sections, in combination with a rotary distribution-commutator in connection with the sections of the primary coil.

7. The combination, with a transformer having primary and secondary coils, of a distribution-commutator consisting of a rotary shaft, insulated sections or bars borne thereby, a series of disks or rings or segments of disks or rings, each of which is in electrical connection with its corresponding bar and insulated from the others, a series of stationary brushes or conductors in contact with said disks and in connection with the respective sections of the coils, and the main brushes for conducting the current to and from the sections or bars.

8. The combination, with a transformer having primary and secondary coils, of a distribution-commutator consisting of a rotary shaft, insulated sections or bars borne thereby, a series of disks or rings or segments of disks or rings, each of which is in electrical connection with its corresponding bar and insulated from the others, a series of stationary brushes or conductors in contact with said disks and in connection with the respective sections of the primary coil, the leading-in brushes for conducting the primary current to and from the sections or bars, and a second commutator of essentially like construction, with its brushes connected to the sections of the secondary coil, and take-off brushes for conducting the secondary current from the sections or bars of the second commutator.

9. The distribution-commutator consisting of a series of insulated bars of successively different lengths, having projections at their opposite ends and arranged with the projections at their one ends all in one plane, in combination with main brushes arranged in the same plane with said projections, and with a series of brushes connected to the respective coils and arranged in different planes corresponding with the paths traversed by the opposite ends of the bars of the commutator.

In witness whereof I have hereunto signed my name in the presence of two subscribing witnesses.

FRANCIS JEHL.

Witnesses:
ROBT. M. HOOPER,
AMAND RITTER.